(12) United States Patent
Lee et al.

(10) Patent No.: US 9,626,038 B2
(45) Date of Patent: Apr. 18, 2017

(54) INPUT DEVICE

(71) Applicant: Samsung Electronics Co., Ltd., Gyeonggi-do (KR)

(72) Inventors: Yu-Sheop Lee, Gyeonggi-do (KR); Joo-Hoon Lee, Gyeonggi-do (KR); Sun-Tae Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/677,598

(22) Filed: Apr. 2, 2015

(65) Prior Publication Data

US 2015/0212651 A1 Jul. 30, 2015

Related U.S. Application Data (63) Continuation of application No. 13/546,608, filed on Jul. 11, 2012, now Pat. No. 9,001,088.

(30) Foreign Application Priority Data

Jul. 11, 2011 (KR) .................. 10-2011-0068641
Oct. 14, 2011 (KR) .................. 10-2011-0105362

(51) Int. Cl.
| | | |
|---|---|---|
| *G06F 3/041* | (2006.01) | |
| *G06F 3/0354* | (2013.01) | |
| *G06F 3/046* | (2006.01) | |
| *G01V 3/40* | (2006.01) | |
| *H01F 1/047* | (2006.01) | |
| *H01F 1/40* | (2006.01) | |

(52) U.S. Cl.
CPC ............. *G06F 3/0418* (2013.01); *G01V 3/40* (2013.01); *G06F 3/03545* (2013.01); *G06F 3/046* (2013.01); *H01F 1/047* (2013.01); *H01F 1/401* (2013.01); *G06F 2203/04103* (2013.01); *G06F 2203/04107* (2013.01)

(58) Field of Classification Search
CPC ......... G06F 3/044; G06F 3/045; G06F 3/0412
USPC ..................... 345/173–179; 178/18.01–18.04
See application file for complete search history.

(56) References Cited

U.S. PATENT DOCUMENTS

| | | | |
|---|---|---|---|
| 3,458,802 A | 7/1969 | Koerner | |
| 6,673,199 B1 * | 1/2004 | Yamartino | ............ H01J 37/321 |
| | | | 118/723 E |
| 8,988,395 B2 * | 3/2015 | Soo | ........................ G06F 3/0416 |
| | | | 178/18.01 |

(Continued)

FOREIGN PATENT DOCUMENTS

| | | |
|---|---|---|
| EP | 2 015 030 | 1/2009 |
| EP | 2 533 139 | 12/2012 |

(Continued)

OTHER PUBLICATIONS

European Search Report dated Nov. 11, 2015, issued in counterpart application No. 12175979.9-1972, 10 pages.

(Continued)

*Primary Examiner* — Kimnhung Nguyen
(74) *Attorney, Agent, or Firm* — The Farrell Law Firm, P.C.

(57) ABSTRACT

An apparatus is provided that includes an electromagnetic sensing unit to sense an electromagnetic field. The apparatus also includes a shielding layer to shield at least a portion of the electromagnetic field, the shielding layer including a magnetic material.

17 Claims, 7 Drawing Sheets

(56) References Cited

U.S. PATENT DOCUMENTS

| | | | |
|---|---|---|---|
| 2004/0140965 A1 | 7/2004 | Wang et al. | |
| 2009/0096766 A1 | 4/2009 | Liu | |
| 2009/0231297 A1 | 9/2009 | Hatakeyama | |
| 2009/0276734 A1 | 11/2009 | Taylor et al. | |
| 2011/0065460 A1 | 3/2011 | Kimishima | |
| 2011/0210696 A1 | 9/2011 | Inoue | |
| 2011/0216032 A1* | 9/2011 | Oda | G06F 3/044 345/174 |
| 2011/0227869 A1* | 9/2011 | Lai | G06F 3/046 345/174 |
| 2012/0068942 A1 | 3/2012 | Lauder et al. | |
| 2012/0306824 A1 | 12/2012 | Horie | |
| 2013/0100055 A1 | 4/2013 | Lauder et al. | |

FOREIGN PATENT DOCUMENTS

| | | |
|---|---|---|
| JP | 2-51083 | 2/1990 |
| JP | 10-49287 | 2/1998 |
| JP | 2001-337614 | 12/2001 |
| JP | 2008-211169 | 9/2008 |
| JP | 2010-266911 | 11/2010 |
| JP | 2011-064592 | 3/2011 |
| JP | 2012-252660 | 12/2012 |
| KR | 1020070105648 | 10/2007 |
| KR | 1020110119066 | 11/2011 |
| RU | 75077 | 7/2008 |
| RU | 2 392 656 | 6/2010 |
| WO | WO 2008/106376 | 9/2008 |
| WO | WO 2009/025279 | 2/2009 |

OTHER PUBLICATIONS

Systems & Solutions, Monthly New Medical June Issue, Japan, Co., Ltd. M. Lee Over the Association for the Promotion, Jun. 1, 2011, vol. 28, No. 6, p. 150-151.
Japanese Office Action dated Jul. 5, 2016 issued in counterpart application No. 2014-520120, 8 pages.
Russian Office Action dated Jul. 6, 2016 issued in counterpart application No. 2014104565/08, 20 pages.
Japanese Office Action dated Nov. 8, 2016 issued in counterpart application No. 2014-520120, 8 pages.

* cited by examiner

(a) Without Amorphous Metal

FIG.4A (b) With Amorphous Metal

INPUT DEVICE

PRIORITY

This application is a Continuation Application of U.S. patent application Ser. No. 13/546,608, filed in the U.S. Patent and Trademark Office on Jul. 11, 2012, which claims priority under 35 U.S.C. §119(a) to a Korean Patent Application filed in the Korean Intellectual Property Office on Jul. 11, 2011 and assigned Serial No. 10-2011-0068641 and to a Korean Patent Application filed in the Korean Intellectual Property Office on Oct. 14, 2011 and assigned Serial No. 10-2011-0105362, the entire disclosure of each of which are incorporated herein by reference.

BACKGROUND OF THE INVENTION

1. Field of the Invention

The present invention relates generally to a pointing input device, and more particularly, to a pointing input device having a magnetic field shielding layer which transmits Earth's magnetic field sensed by a geo-magnetic sensor.

2. Description of the Related Art

With the rapid development of markets related to smart phones or touch screens, research has been actively conducted on these devices. A touch screen is widely used as an input device of a mobile terminal and generally includes a transparent electrode. The touch screen of a capacitive type, which measures a change in electrostatic capacity occurring due to a touch is commonly used, however, in the capacitive-type touch screen, a user must provide a predetermined pressure or displacement by contacting the touch screen, and cannot perform an input operation by using a pen.

To overcome these disadvantages, a touch screen using electromagnetic waves has recently become popular. A pointing input device using this scheme can be classified into various types, an example of which is an Electro-Magnetic Resonance (EMR) type.

However, an electronic device such as a mobile terminal, etc., often includes a tool for mounting a pointing input device, a battery, various circuit units, etc., which may block or disturb a magnetic field. As a result, the performance of the pointing input device is negatively affected. To prevent such a negative influence, a magnetic field shielding layer is used.

A mobile terminal employs various additional functions to improve convenience and entertainment of a user. For example, a screen changes according to the amount of movement of the mobile terminal. To sense the movement, the mobile terminal is equipped with a geo-magnetic sensor. However, if the geo-magnetic sensor is provided in the pointing input device, the operation of the geo-magnetic sensor may be affected by the magnetic field shielding layer.

In addition, in a mobile terminal are mounted parts having strong magnets, such as a speaker, a camera, etc., as well as the geo-magnetic sensor. Such magnetic parts generate a strong low-frequency magnetic field, and thus there is a need for a magnetic field shielding layer.

The magnetic field shielding layer prevents an eddy current from being induced, allowing accurate tracking of a position of an electromagnetic pen. However, if the geo-magnetic sensor is disposed near the magnetic field shielding layer, a low-frequency magnetic field such as the Earth's magnetic field is blocked or distorted by the magnetic field shielding layer, making it difficult to perform an accurate geo-magnetic sensing operation.

Therefore, there is a need for a magnetic field shielding layer which prevents attenuation of the magnetic field by blocking the magnetic field generated by the tool, the battery, the various circuits, etc., disposed under the magnetic field shielding layer, while transmitting Earth's magnetic field sensed by the geo-magnetic sensor and not affecting the operation of the geo-magnetic sensor. Moreover, when a pointing input device such as the mobile terminal includes magnetic parts, a magnetic field shielding layer is required which effectively blocks a strong low-frequency magnetic field signal, and at the same time, transmits a low-frequency magnetic field guaranteeing an operation of the geo-magnetic sensor.

SUMMARY OF THE INVENTION

Accordingly, an aspect of the present invention is to provide a pointing input device having a magnetic field shielding layer, which does not affect an operation of a geo-magnetic sensor.

Another aspect of the present invention is to provide a pointing input device having a magnetic field shielding layer, which partially transmits an applied magnetic field to allow a geo-magnetic sensor to sense Earth's magnetic field.

Another aspect of the present invention is to provide a pointing input device having a magnetic field shielding layer, which allows a geo-magnetic sensor to sense Earth's magnetic field and effectively blocks a magnetic field signal generated by magnetic parts.

According to an aspect of the present invention, an apparatus is provided that includes an electromagnetic sensing unit to sense an electromagnetic field. The apparatus also includes a shielding layer to shield at least a portion of the electromagnetic field, the shielding layer including a magnetic material.

According to another aspect of the present invention, an apparatus is provided that includes an electromagnetic sensing unit to sense an electromagnetic field generated by an electronic device external to the apparatus. The apparatus also includes a shielding layer to shield at least a portion of the electromagnetic field, at least one portion of the shielding layer including a magnetic material.

According to a further aspect of the present invention, an apparatus is provided that includes an electromagnetic sensing unit to sense an electromagnetic field. The apparatus also includes a shielding layer disposed adjacent to the electromagnetic sensing unit, the shielding layer including a material having a permeability characteristic, the permeability characteristic being maintained at a specified range between a first specified frequency band and a second specified frequency band.

BRIEF DESCRIPTION OF THE DRAWINGS

The above and other features and advantages of embodiments of the present invention will be more apparent from the following detailed description taken in conjunction with the accompanying drawings, in which.

DETAILED DESCRIPTION OF THE EMBODIMENTS OF THE PRESENT INVENTION

Hereinafter, embodiments of the present invention will be described in detail with reference to the accompanying drawings. It should be noted that identical components are referred to by identical reference numerals throughout the drawings. Detailed descriptions of functions and configurations incorporated herein that are well known to those skilled in the art will be omitted to avoid unnecessarily obscuring the present invention.

The present invention provides a magnetic field shielding layer that does not affect operation of a geo-magnetic sensor in a pointing input device of a touch screen type using an electromagnetic pen. The magnetic field shielding layer includes a metal powder material. The magnetic field shielding layer may be formed directly on the pointing input device without a separate adhesive layer, by mixing magnetic powder and an adhesive and applying the mixture.

The operation principles of a pointing input device of an Electro-Magnetic Resonance (EMR) type used in embodiments of the present invention is described briefly. The pointing input device of this type includes a touch screen.

Figure 1:
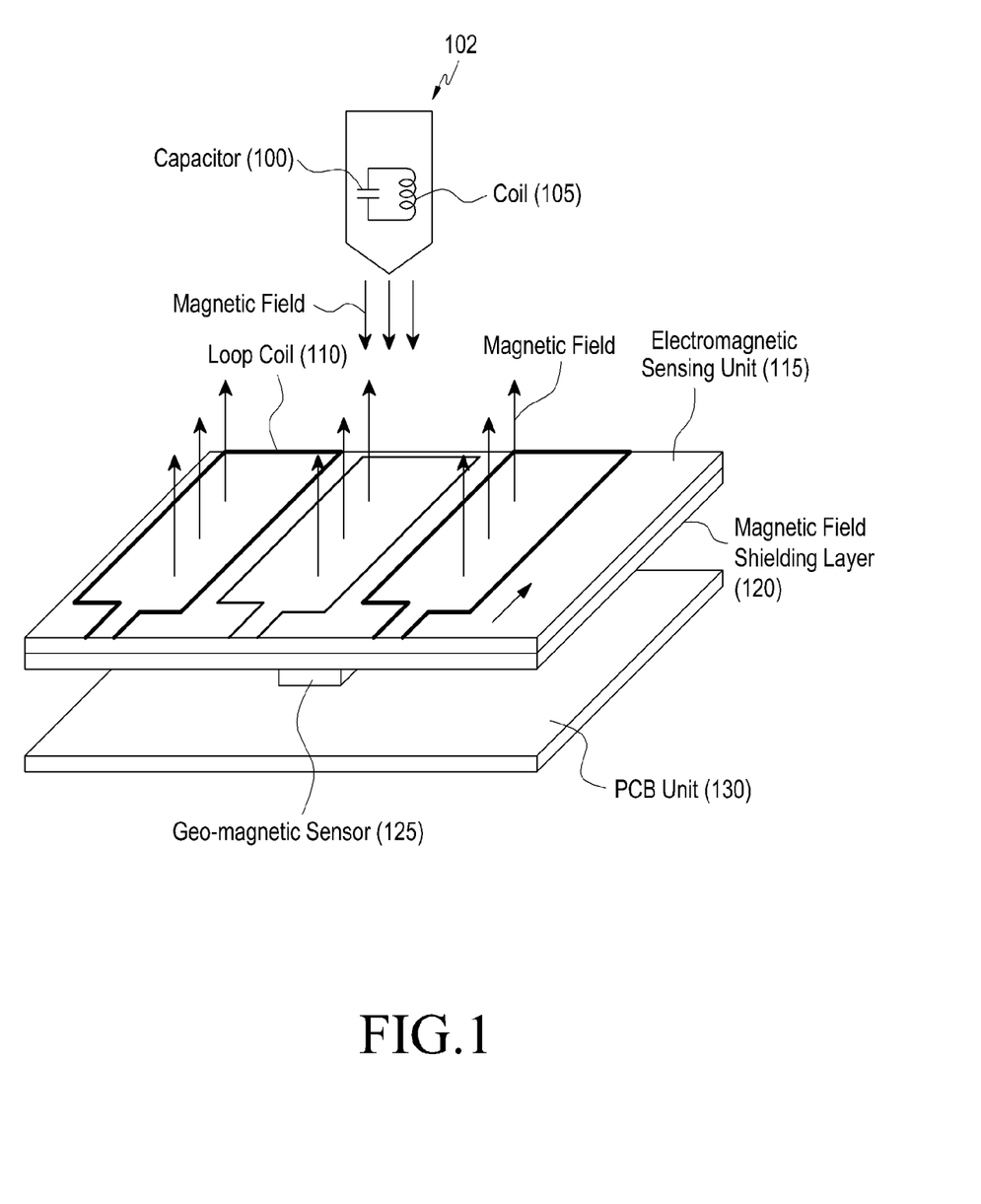
FIG. 1 illustrates a cross-section of a pointing input device having a magnetic field shielding layer according to an embodiment of the present invention.

Referring to FIG. 1, in the EMR-type pointing input device, a loop coil 110 is disposed on an electromagnetic sensing unit 115 and current is applied to the loop coil 110, such that a magnetic field is generated and the generated magnetic field is absorbed by the electromagnetic pen 102. The electromagnetic pen 102 includes a capacitor 100 and a coil 105 and emits the absorbed magnetic field at a predetermined frequency.

The magnetic field emitted by the electromagnetic pen 102 is absorbed by the loop coil 110 of the electromagnetic sensing unit 115, such that the electromagnetic sensing unit 115 determines which position of the pointing input device the electromagnetic pen 102 is close to.

As such, the electromagnetic sensing unit 115 includes a plurality of loop coils 110 which interact with the electromagnetic pen 102, and the plurality of loop coils 110 are disposed to overlap each other. When a user moves the electromagnetic pen 102 close to a particular portion of the plurality of loop coils 110, the plurality of loop coils 110 senses a magnetic field generated from the electromagnetic pen 102. Thus, each of the plurality of loop coils 110 outputs a current induced by the sensed magnetic field. As the loop coil 110 is disposed closer to the electromagnetic pen 102, it senses a magnetic field having a larger amplitude and emits a corresponding induced current. Thus, the plurality of loop coils 110 output induced currents of various magnitudes, such that by measuring the outputs of the loop coils 110, the position of the electromagnetic pen 102 is tracked.

Under the electromagnetic sensing unit 115 is provided a magnetic field shielding layer 120. Under the magnetic field shielding layer 120 is provided a Printed Circuit Board (PCB) portion 130 in which a tool for firmly mounting the pointing input device, a battery, and various circuit units, etc., are disposed. The magnetic field shielding layer 120 blocks a magnetic field generated from the circuit units, etc., disposed on the PCB portion 130 under the magnetic field shielding layer 120 to prevent magnetic field attenuation.

Figure 2:
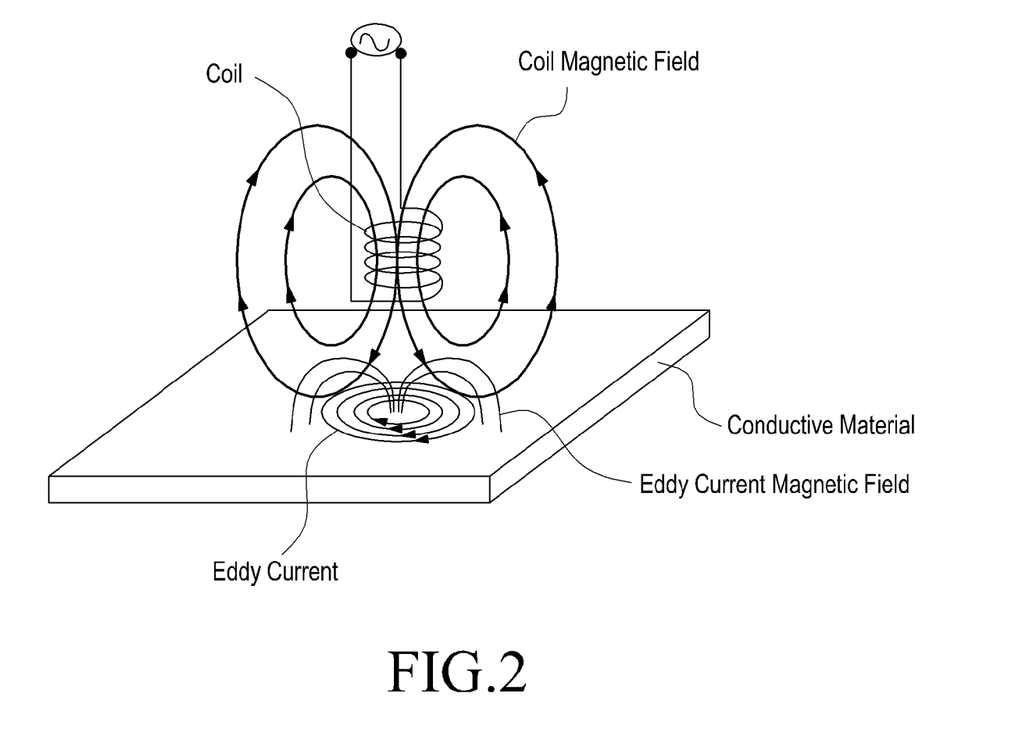
FIG. 2 illustrates attenuation of a magnetic field caused by an eddy current.

FIG. 2 illustrates the principle of a magnetic field shielding layer. FIG. 2 assumes that a magnetic field is applied to metal, which is a conductive material having a low resistance, without a magnetic field shielding layer. When a magnetic field is applied to a material having a low electric resistance, an eddy current is generated. The eddy current generates a magnetic field opposing the applied coil magnetic field, thus generating an eddy current magnetic field. As a result, the coil magnetic field is attenuated by the eddy current magnetic field and thus is reduced. Consequently, when an intensity of the magnetic field emitted by the electromagnetic pen 102 is reduced, a maximum distance required for sensing the magnetic field is reduced, increasing the probability of malfunction. That is, the electromagnetic pen 102 can be sensed within the maximum distance by the electromagnetic sensing unit 115.

To prevent such a phenomenon, the magnetic field shielding layer 120 is used. In this case, the coil magnetic field does not reach under the magnetic field shielding layer 120, such that the eddy current is not generated even when a conductor exists under the magnetic field shielding layer 120, thereby preventing magnetic field attenuation. Consequently, the coil magnetic field reaches the electromagnetic sensing unit 115 near the magnetic field shielding layer 120, without magnetic field attenuation, such that the magnetic field induced by the electromagnetic pen 102 can be sensed.

Generally, for the magnetic field shielding layer for the pointing input device, an alloy thin film composed of silicon (Si) based on iron (Fe) is used. Recently, amorphous metal made by mixing iron (Fe), Silicon (Si), and boron (B), while altering a crystal structure of the mixture, has been used. Ratios of the metals described above are adjusted according to a type of pointing input device being used. The amorphous metal is a material that has superior magnetic field shielding performance with high permeability and conductivity with respect to a magnetic field in a band of several hundreds of kHz and a low-frequency band that are generally used for a pointing input device. In particular, the amorphous metal has much higher permeability than other materials in DC (Direct Current).

Figure 3:
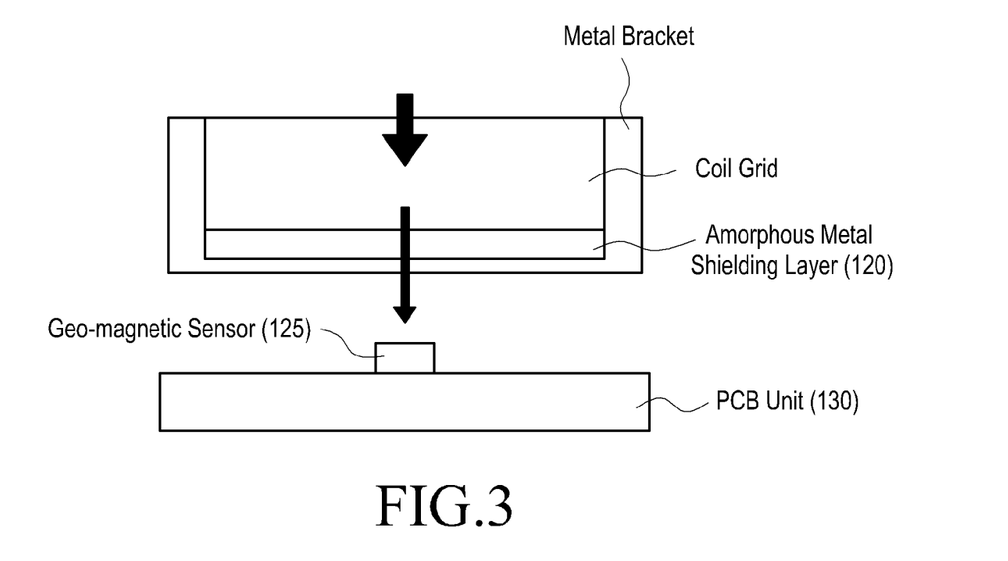
FIG. 3 illustrates a cross-sectional view of a pointing input device as a comparison example.

However, when a geo-magnetic sensor 125 is positioned near the magnetic field shielding layer 120 composed of the amorphous metal illustrated in FIG. 3, Earth's magnetic field sensed by the geo-magnetic sensor 125 may be blocked or distorted by the magnetic field shielding layer 120. In other words, due to the amorphous metal having high permeability in DC, the geo-magnetic sensor 125 has difficulty sensing Earth's magnetic field, which is a DC magnetic field.

Figure 4A:
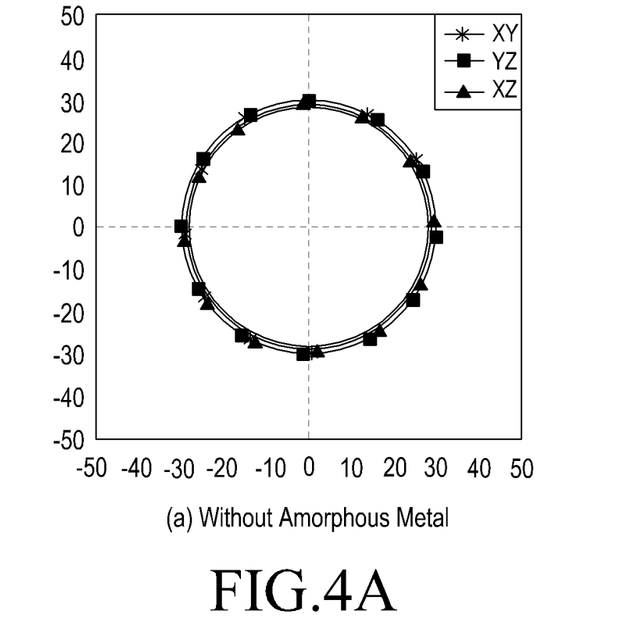
FIGS. 4A and 4B are graphs illustrating characteristics of a magnetic field sensor when conventional amorphous metal is used.
Figure 4B:
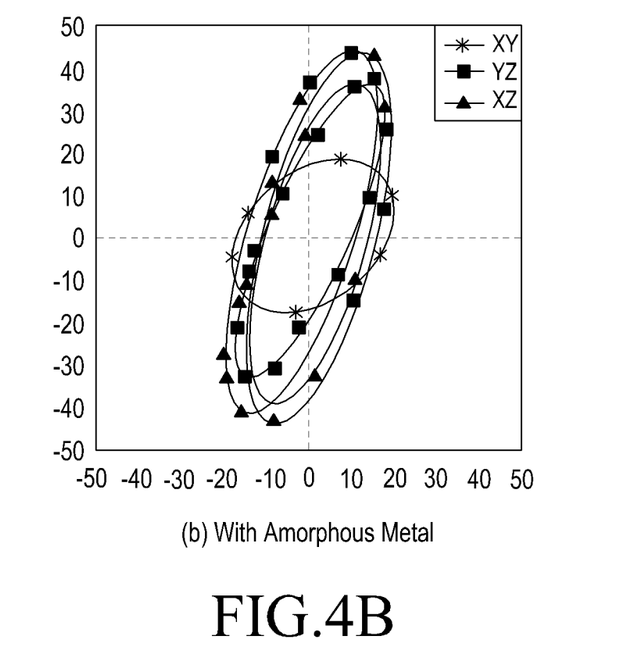

An evaluation of characteristics of a geo-magnetic sensor when the amorphous metal is used is illustrated in FIG. 4B. In FIGS. 4A and 4B, graphs show outputs of the geo-magnetic sensor without and with an amorphous metal present, respectively, when a DC magnetic field is applied by rotating around the geo-magnetic sensor. The direction of the applied magnetic field is determined by a ratio of direction components of the geo-magnetic sensor output, that is, a ratio of outputs along X and Y axes of the graph. Therefore, to know an accurate magnetic field direction, the geo-magnetic sensor needs to have the same sensitivity for the magnetic field direction along the X and Y axes. For example, when the magnetic field is applied in a direction of 45 degrees, the strengths of the magnetic field measured on the respective axes have to be equal.

Therefore, if a magnetic field of a predetermined strength is applied to all directions during a normal operation of the geo-magnetic sensor, the strengths of the magnetic field in the X and Y directions are such that one decreases if the other increases, and thus a vector sum of the two strengths forms a predetermined shape, i.e., a circle, as illustrated in FIG. 4A.

When a magnetic body exists near the geo-magnetic sensor, a center of the circle shown in FIG. 4A moves or the shape of the circle shown in FIG. 4A changes into an oval shape as illustrated in FIG. 4B. The graph shown in FIG. 4B indicates that the geo-magnetic sensor malfunctions due to blocking or disturbance of the Earth's magnetic field caused by the amorphous metal. Moreover, the amorphous metal has a strong residual field, such that when a strong magnetic field is applied to the amorphous metal, the amorphous metal maintains a magnetized condition, thus serving as a permanent magnet. Subsequently, an influence upon the geo-magnetic sensor is continuously maintained.

Figure 5:
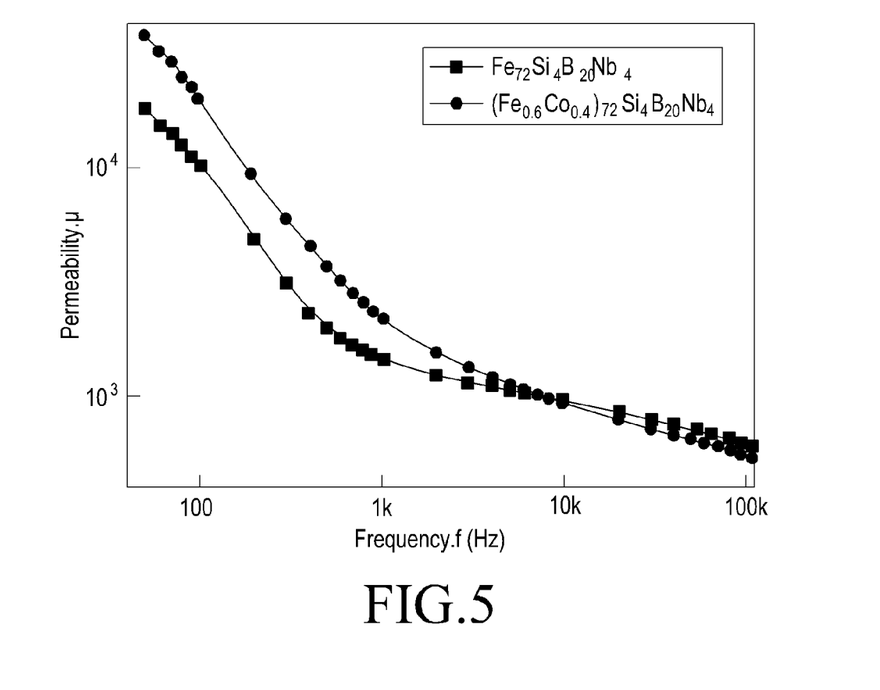
FIG. 5 is a graph illustrating permeability characteristics of amorphous metal with respect to frequency.

FIG. 5 illustrates permeability characteristics of amorphous metal with respect to frequency. Permeability shown in FIG. 5 is higher than 1,000 μ0 in a band of a frequency of 100 kHz or less. The μ0 is defined as the permeability in a vacuum. It can be seen from FIG. 5 that an influence of amorphous metal upon the geo-magnetic sensor is significant.

Therefore, a pointing input device having a magnetic field sensing function, such as in a geo-magnetic sensor, needs a magnetic field shielding layer that can perform a magnetic field shielding function without affecting the geo-magnetic sensor.

Figure 6:
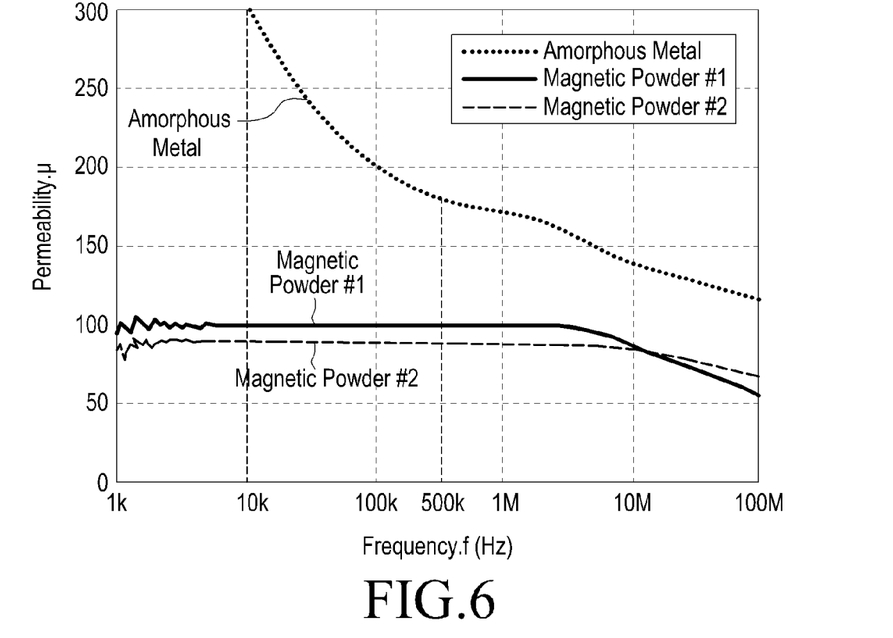
FIG. 6 is a graph illustrating permeability characteristics of amorphous metal and magnetic powder with respect to frequency.

An embodiment of the present invention provides a magnetic field shielding layer composed of a magnetic powder material. FIG. 6 illustrates characteristics of a magnetic powder material. The amorphous metal has a permeability of 170 μ0 or more in a 500 kHz band and has a permeability of 10,000 μ0 or more in a band of a frequency less than 500 kHz, as illustrated in FIG. 5. In this case, Earth's magnetic field is blocked or distorted by amorphous metal, such that the geo-magnetic sensor cannot operate to sense Earth's magnetic field.

The magnetic powder material used in an embodiment of the present invention has a permeability of 100 μ0 in the 500 kHz band and maintains this permeability over a large frequency area. Moreover, a similar permeability is provided in the DC band. Therefore, considering that the DC permeability of amorphous metal is higher than 10,000 μ0, the permeability of the magnetic powder material is 1/100 of that of the amorphous metal, such that the influence of the magnetic powder upon the geo-magnetic sensor is minimized.

Although permeability in a band of 500 kHz is 100 μ0 as an example, a magnetic field shielding layer may be formed to have a permeability of 150 μ0 by using the magnetic powder material. In this case, the magnetic field shielding layer has a permeability similar to that of the amorphous metal in a primary band without having a large influence upon the performance of the pointing input device, thereby blocking a magnetic field induced by an electromagnetic pen. In addition, the permeability of the magnetic powder material is maintained at a relatively low level across a large frequency area, such that Earth's magnetic field sensed by the geo-magnetic sensor is transmitted.

Figure 7:
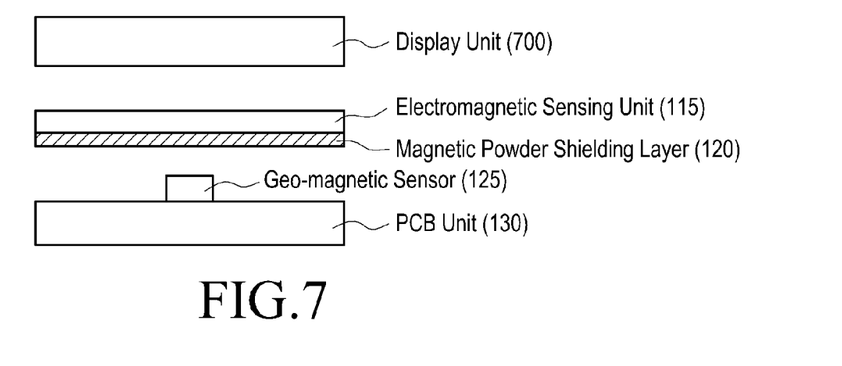
FIG. 7 illustrates a cross-sectional view for describing a form in which a magnetic field shielding layer is disposed according to an embodiment of the present invention.

FIG. 7 illustrates a form in which the magnetic field shielding layer composed of the magnetic powder material is disposed according to an embodiment of the present invention.

FIG. 7 is a cross-sectional view of the pointing input device shown in FIG. 1. The pointing input device includes a display unit 700, the electromagnetic sensing unit 115, the magnetic field shielding layer 120, the geo-magnetic sensor 125, and the PCB unit 130.

The display unit 700 is a region for displaying visual information recognizable by a user. The display unit 700 receives an external input of a control signal or a graphic signal and displays a display screen corresponding to the control signal or the graphic signal. The display unit 700 is preferably a Liquid Crystal Display (LCD) module, but there is no limit on a type of the display unit 700, as can be easily understood by those of ordinary skill in the art.

The electromagnetic sensing unit 115 is disposed adjacent to a bottom surface of the display unit 700. A structure of the electromagnetic sensing unit 115 is the same as described above with reference to FIG. 1. The electromagnetic sensing unit 115 senses electromagnetism incident from an electromagnetic pen, which approaches or contacts a top surface of the display unit 700, thereby determining a point selected by the user.

The geo-magnetic sensor 125 is disposed in the pointing input device, and senses a part of Earth's magnetic field passing through the magnetic field shielding layer 120. The geo-magnetic sensor 125 is positioned under the magnetic field shielding layer 120, which is not affected by the magnetic field of the electromagnetic pen. As another example, the geo-magnetic sensor 125 is disposed on the PCB unit 130.

The PCB unit 130 includes various electronic components capable of electrically operating and controlling the pointing input device. The magnetic field including electromagnetic waves generated from the various electronic parts of the PCB unit 130 is blocked by the magnetic field shielding layer 120 composed of the magnetic powder material.

The magnetic field shielding layer 120 according to an embodiment of the present invention is composed of a magnetic powder material, and is disposed under the electromagnetic sensing unit 115. The magnetic field shielding layer 120 is a partial shielding layer capable of partially transmitting the applied magnetic field, and is formed by scattering the magnetic powder. Magnetic metal powder called ferrite, MolyPermalloy Powder (MPP), a Fe—Si—Al-based material (Sandust), a Ni—Fe-based material (Highflux), or the like may be used. Since the magnetic powder is in the form of a powder, it is spread after being mixed with an adhesive such as a polymer including polypropylene (PP), polyethylene (PE), etc. Amorphous metal powder and the magnetic powder are preferably used together, and the magnetic metal powder and the amorphous metal powder are mixed with an adhesive to form the magnetic field shielding layer 120. The magnetic metal powder and the amorphous metal powder are mixed in a ratio to obtain a permeability similar to a metal thin film.

The magnetic field shielding layer 120 formed of the magnetic powder has a different permeability and a different density of the magnetic powder. As the density of the magnetic powder increases, the permeability of the magnetic field shielding layer 120 increases. Thus, the density of the magnetic powder of the magnetic field shielding layer 120 is adjusted to obtain a permeability similar to that when a metal thin film is used, but unlike when the metal thin film is used, Earth's magnetic field is transmitted, such that the operation of the geo-magnetic sensor 125 is not affected.

Figure 10:
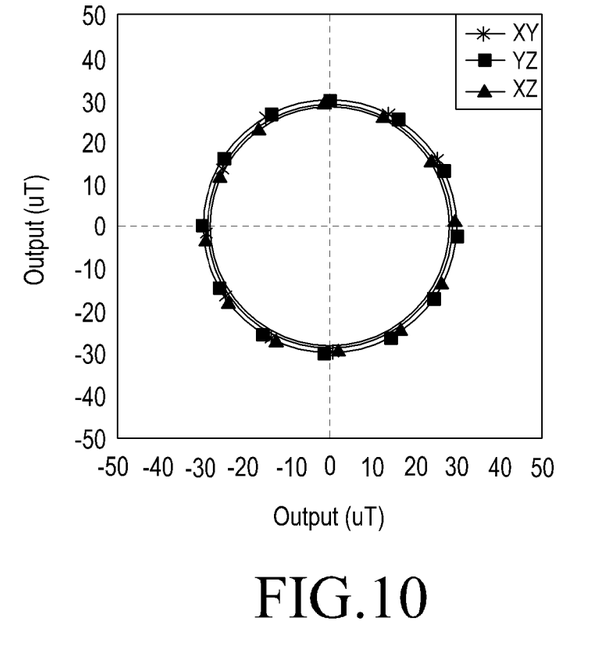
FIG. 10 is a graph illustrating characteristics of a geo-magnetic sensor when a magnetic powder material is used according to an embodiment of the present invention.

The permeability of the magnetic field shielding layer 120 differs according to a mixing ratio of magnetic powder mixed with polymer to form the magnetic field shielding layer 120, i.e., a density of the magnetic powder. The density of the magnetic powder, i.e. the mixing ratio, is preferably set such that the permeability of the magnetic field shielding layer 120 is 100-200 μ0 in the DC band. Thus, output characteristics of the geo-magnetic sensor illustrated in FIG. 10 is obtained, and these characteristics are similar to those shown in FIG. 4A, which correspond to absence of the amorphous metal. That is, when the magnetic powder material is used, the geo-magnetic sensor 125 operates normally. The magnetic field shielding later 120 is a mixture of the magnetic powder and the adhesive. Alternatively, the magnetic field shielding later 120 is a mixture of the magnetic powder and the amorphous metal powder with the adhesive.

Such a magnetic powder is mixed with an adhesive, and adhered to the electromagnetic sensing unit 115. Thus, when compared to a conventional magnetic field shielding layer for which an adhesive is spread and then a metal thin film is then adhered, the magnetic field shielding layer 120 does not need a separate adhesive layer, contributing to a reduction in thickness. In other words, the magnetic powder material is in a liquid state when mixed with the adhesive, and can thus be uniformly spread on the electromagnetic sensing unit 115. As such, unlike when a conventional metal thin film is used, the magnetic powder material is uniformly spread, such that uniform shielding performance can be obtained over the entire surface of the magnetic field shielding layer 120. Moreover, the magnetic field shielding layer 120 is directly adhered to the pointing input device without a separate adhesive layer, simplifying processing and reducing an extra thickness corresponding to the thickness of the conventional adhesive layer.

As described above, the magnetic powder material may be coated to, e.g., a surface of the electromagnetic sensing unit 115 in the pointing input device. Alternatively, the magnetic powder material may be coated onto an adhesive film having adhesion and then onto a surface in the pointing input device.

A residual magnetic field of the magnetic powder material is not strong, unlike when using the amorphous metal thin film, such that even when a strong magnetic field is applied to the magnetic powder material, the magnetic powder material does not affect the operation of the geo-magnetic sensor. However, the pointing input device having the magnetic field shielding layer 120 using the magnetic powder material, when placed on a magnetic field disturbing material such as a conductor, may experience degradation in sensitivity due to an influence of an eddy current, generation of a magnetic field, or degradation of absorbing characteristics. However, such sensitivity degradation is relative to the amorphous metal thin film, and has a proper level of sensitivity for the pointing input device illustrated in FIG. 11.

Figure 11:
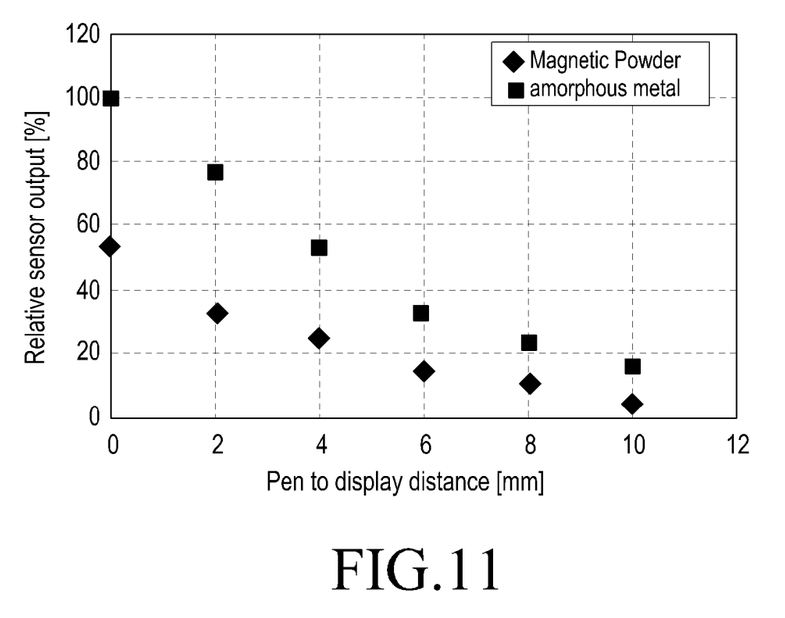
FIG. 11 is a graph illustrating sensitivity comparison when amorphous metal and magnetic powder having a permeability of 150 μ0 are used according to an embodiment of the present invention.

FIG. 11 is a graph illustrating sensitivity comparison when amorphous metal and magnetic powder are used according to an embodiment of the present invention. In FIG. 11, a signal strength of a touch screen which uses a magnetic powder material having a permeability of 150 μ0 and a thickness of 50 μm and an amorphous metal thin film having a thickness of 25 μm is measured. As shown in FIG. 11, the magnetic powder material may have a lower sensitivity than the amorphous metal thin film, but its sensitivity may be adjusted by adjusting a thickness to obtain a desired sensitivity. The thickness of the magnetic field shielding layer 120, according to an embodiment of the present invention, is preferably 50 μm or more. Since the permeability of the magnetic field shielding layer 120 varies according to the thickness of the magnetic field shielding layer 120, the thickness is be set as according to the desired permeability.

Figure 8:
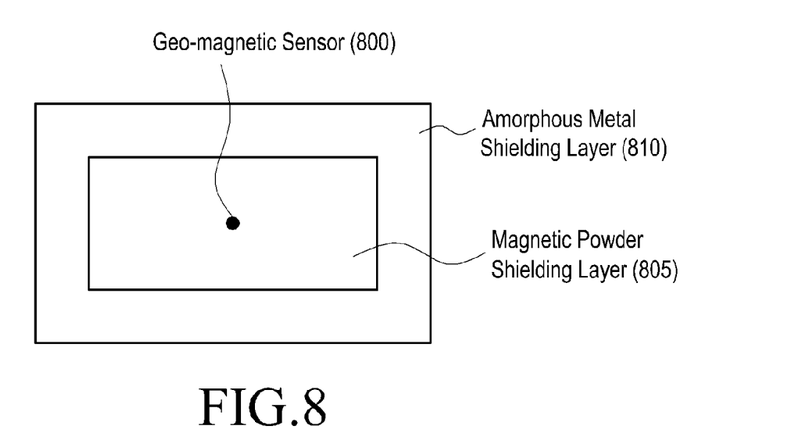
FIG. 8 is a diagram illustrating a form in which a magnetic field shielding layer is disposed according to an embodiment of the present invention.

According to an embodiment of the present invention, a magnetic field shielding layer is formed as illustrated in FIG. 8. In FIG. 8, a magnetic field shielding layer 805 using magnetic powder, i.e., a magnetic powder shielding layer, is disposed around a geo-magnetic sensor 800, and a magnetic field shielding layer 810 using an amorphous metal thin film, i.e., an amorphous metal shielding layer, is disposed on the other area. For example, when the geo-magnetic sensor 800 is disposed at the center, the magnetic powder shielding layer 805 is disposed around the geo-magnetic sensor 800 to guarantee the normal operation of the geo-magnetic sensor 800 and the amorphous metal shielding layer 810 is disposed on the other area to improve sensitivity.

Figure 9:
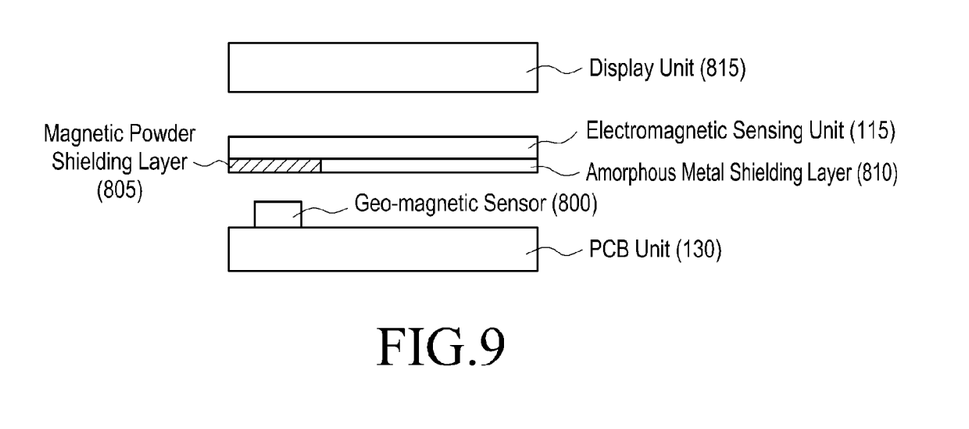
FIG. 9 is a cross-sectional view of FIG. 8.

An arrangement illustrated in FIG. 9 is employed. FIG. 9 illustrates a cross-section of the arrangement of the magnetic powder shielding layer 805 and the amorphous metal shielding layer 810, including a display unit 815. The magnetic field shielding layer includes the magnetic powder shielding layer 805 in which magnetic powder for partially transmitting the applied Earth's magnetic field is scattered, and the amorphous metal shielding layer 810, which uses the amorphous metal thin film for blocking the applied magnetic field. The positions of the magnetic powder shielding layer 805 and the amorphous metal shielding layer 810 change according to the position of the geo-magnetic sensor 800.

In another embodiment shown in FIGS. 8 and 9, a portion of the entire magnetic field shielding layer corresponding to the position of the geo-magnetic sensor 800 is formed as the magnetic powder shielding layer 805 using the magnetic powder. By using the magnetic powder, the low-frequency magnetic field, such as Earth's magnetic field, sensed by the geo-magnetic sensor 800 is transmitted, but transmission of a magnetic field of a frequency used for pointing is restricted. However, the other portion of the magnetic field shielding layer is formed of the amorphous metal shielding layer 810 preventing a magnetic field generated according to arrangement of a tool, a battery, various circuit units, and so forth, on which the pointing input device is mounted.

However, the amorphous metal shielding layer 810 is formed in a region other than a region where the magnetic powder shielding layer 805 is formed, as shown in FIGS. 8 and 9, such that Earth's magnetic field is partially blocked by the amorphous metal shielding layer 810, degrading the performance of the geo-magnetic sensor 800 when compared to the structure of the magnetic field shielding layer 120 shown in FIG. 7. For example, in FIG. 7 according to an embodiment of the present invention, the entire magnetic field shielding layer 120 is formed of the magnetic powder, regardless of the position of the geo-magnetic sensor 125, such that the magnetic powder shielding layer 120 does not block the Earth's magnetic field and therefore does not affect the performance of the geo-magnetic sensor 125.

Figure 12:
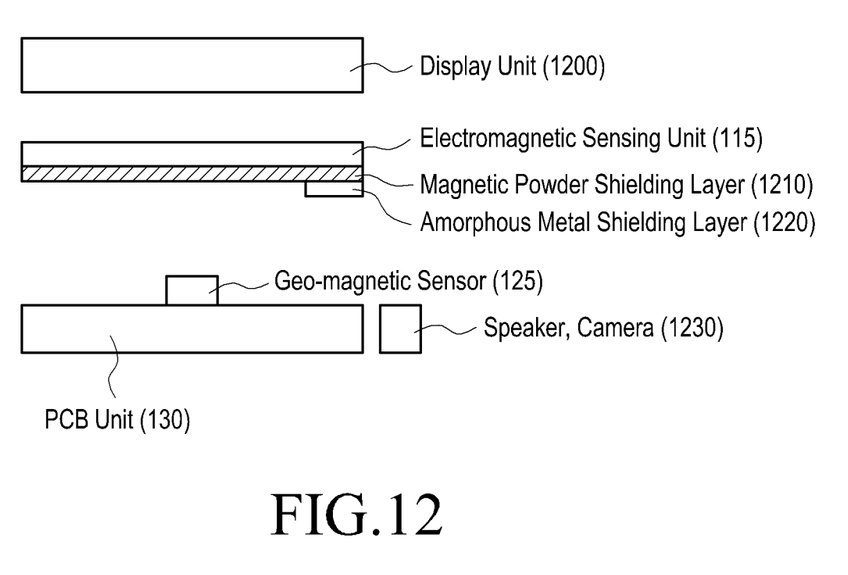
FIG. 12 is a cross-sectional view illustrating a form in which a magnetic field shielding layer is disposed according to a further embodiment of the present invention.

Therefore, an embodiment of the present invention provides a structure of a magnetic field shielding layer illustrated in FIG. 12. In particular, the embodiment of the present invention illustrated in FIG. 12 provides a structure of a magnetic field shielding layer where a magnetic part for generating a strong low-frequency magnetic field, other than a geo-magnetic sensor, is mounted.

Although a speaker and a camera 1230 are mounted as examples of the magnetic parts 1230 on a side of the PCB unit 130 in FIG. 12, the magnetic parts 1230 are also disposed on the PCB unit 130. A magnetic field generated in the magnetic parts 1230 passes through the magnetic powder shielding layer, thus affecting the performance of the pointing input device. For example, for electromagnetic waves, a magnetic field generated in a magnetic part changes frequency and strength of a signal generated in a pen, interrupting the operation of the pen. However, if a magnetic field shielding layer having a superior shielding property, such as amorphous metal, replaces the magnetic powder shielding layer 120 shown in FIG. 7 to block the magnetic field generated in the magnetic part, the amorphous metal shielding layer affects the performance of the geo-magnetic sensor 125.

Therefore, taking the foregoing points into account, the embodiment of the present invention illustrated in FIG. 12 provides a structure, which effectively blocks the magnetic field generated by the magnetic parts 1230 without affecting the performance of the geo-magnetic sensor 800.

A structure of the magnetic field shielding layer illustrated in FIG. 12 is different from the structure of the magnetic field shielding layer shown in FIG. 7 in that an amorphous metal shielding layer 1220 is disposed under a magnetic powder shielding layer 1210 and in proximity to a magnetic field which generates a strong low-frequency magnetic field, e.g., a speaker/camera 1230. The amorphous metal shielding layer 1220 is disposed under the magnetic powder shielding layer 1210 formed on a surface of the electromagnetic sensing unit 115 and in proximity to the speaker/camera 1230 by closely contacting the magnetic powder shielding layer 1210. The amorphous metal shielding layer 1220 closely contacts a portion of the surface of the magnetic powder shielding layer 1210 rather than the entire surface thereof, and the size and position of the amorphous metal shielding layer 1220 is such that it can block the magnetic field generated by the magnetic parts 1230, and thus varies according to the size and position of the magnetic part.

The magnetic field shielding layer according to an embodiment of the present invention prevents a magnetic field generated by the electromagnetic pen from reaching a conductor positioned under the magnetic field shielding layer, and minimizes influence upon an operation of the geo-magnetic sensor installed in the pointing input device.

Moreover, by using the magnetic powder in the electromagnetic shielding layer according to an embodiment of the present invention, the electromagnetic shielding layer is formed directly in the pointing input device without a separate adhesive layer, thereby reducing the thickness of the pointing input device.

Furthermore, embodiments of the present invention minimize influence upon the geo-magnetic sensor and maximize sensitivity of the geo-magnetic sensor by using a mixture of different magnetic powders.

In addition, the magnetic field shielding layer having a low magnetic field shielding property such as a magnetic powder material and the magnetic field shielding layer having a superior shielding property such as amorphous metal are arranged according to the positions of the geo-magnetic sensor, the speaker, and the camera, guaranteeing both the performance of the geo-magnetic sensor and the performance of the pointing input device.

While the invention has been shown and described with reference to embodiments thereof, it will be understood by those skilled in the art that various changes in form and details may be made without departing from the scope of the invention as defined by the appended claims and their equivalents.

What is claimed is:

1. An apparatus comprising:
   an electromagnetic sensing unit to sense an electromagnetic field;
   a shielding layer disposed under the electromagnetic sensing unit to shield at least a portion of the electromagnetic field, the shielding layer including a magnetic material; and
   a geomagnetic sensor disposed under at least a portion of the shielding layer to sense geomagnetic field.

2. The apparatus of claim 1, further comprising:
   a display operatively coupled with the apparatus, the display being disposed over the electromagnetic sensing unit.

3. The apparatus of claim 1, wherein the magnetic material comprises a permeability characteristic being maintained at a specified range between a zero frequency band and an operating frequency band to be received or transmitted using the electromagnetic sensing unit.

4. The apparatus of claim 1, wherein the magnetic material comprises powder.

5. The apparatus of claim 1, wherein the magnetic material comprises at least one of ferrite, MolyPermalloy material, Fe—Si—Al-based material (Sandust), or Ni—Fe-based material (Highflux).

6. The apparatus of claim 1, wherein the shielding layer comprises a mixture of at least the magnetic material and an adhesive material.

7. The apparatus of claim 1, wherein the shielding layer is formed by being spread onto a bottom surface of the electromagnetic sensing unit.

8. The apparatus of claim 1, wherein the shielding layer is formed at least from an adhesive film on which the magnetic material is coated.

9. The apparatus of claim 1, wherein the electromagnetic field comprises an input signal generated by an electronic device external to the apparatus.

10. An apparatus comprising:
    an electromagnetic sensing unit to sense an electromagnetic field generated by an electronic device external to the apparatus;
    a shielding layer disposed under the electromagnetic sensing unit to shield at least a portion of the electromagnetic field, at least one portion of the shielding layer including a magnetic material; and
    a geomagnetic sensor disposed under at least a portion of the shielding layer to sense geomagnetic field.

11. The apparatus of claim 10, wherein the magnetic material comprises a permeability characteristic being maintained at a specified range between a zero frequency band and an operating frequency band to be received or transmitted using the electromagnetic sensing unit.

12. The apparatus of claim 10, wherein the electromagnetic sensing unit comprises an electromagnetic resonance sensor.

13. The apparatus of claim 10, wherein the electromagnetic sensing unit is configured to detect a position of the electronic device.

14. The apparatus of claim 10, wherein the electronic device comprises an electromagnetic pen.

15. An apparatus comprising:
- an electromagnetic sensing unit to sense an electromagnetic field;
- a shielding layer disposed under the electromagnetic sensing unit, the shielding layer including a material having a permeability characteristic, the permeability characteristic being maintained at a specified range between a first specified frequency band and a second specified frequency band; and
- a geomagnetic sensor disposed under at least a portion of the shielding layer to sense geomagnetic field.

16. The apparatus of claim 15, wherein the first specified frequency band comprises a zero frequency band.

17. The apparatus of claim 15, wherein the second specified frequency band comprises an operating frequency band to receive or transmit a signal using the electromagnetic sensing unit.

\* \* \* \* \*